UNITED STATES PATENT OFFICE.

AUGUSTE J. ROSSI, OF NEW YORK, N. Y., ASSIGNOR OF ONE-HALF TO JAMES MacNAUGHTON, OF TAHAWUS, NEW YORK.

PROCESS OF PRODUCING CONCENTRATES CONTAINING HIGH PERCENTAGES OF TITANIC OXID.

SPECIFICATION forming part of Letters Patent No. 668,266, dated February 19, 1901.

Application filed February 19, 1900. Serial No. 5,845. (No specimens.)

*To all whom it may concern:*

Be it known that I, AUGUSTE J. ROSSI, a citizen of the United States, residing in the borough of Manhattan, city, county, and State of New York, have invented certain new and useful Improvements in Processes of Producing Concentrates Containing High Percentages of Titanic Oxid, of which the following is a specification.

The object of my invention is to derive out of natural compounds containing a good percentage of titanic oxid and readily and economically obtained—as, for instance, "titaniferous iron ores," so called, containing, say, fifty to fifty-three per cent. iron corresponding to seventy-two to seventy-five per cent. oxid of iron or more and twelve to fifteen per cent. of titanium corresponding to twenty to twenty-five per cent. of titanic oxid—an artificial product or concentrate containing the desired titanic oxid in much higher percentages and also comparatively free from certain particularly undesirable impurities—as, for instance, the silica existing in such ore.

I have heretofore invented as a new article the alloy of titanium and iron containing titanium in industrially important proportions—that is to say, in excess of five per cent. of titanium—and an important quantity of iron—say not less than ten per cent. of the mass—which alloy is commonly known as "ferrotitanium," and for which Letters Patent of the United States No. 609,466, dated August 23, 1898, have been granted, and I have also invented divers processes for conveniently and economically producing such ferrotitanium, for some of which the said Letters Patent last mentioned have been granted, and for others Letters Patent No. 609,467, dated August 23, 1898, and for others of which applications for Letters Patent are now pending in the United States Patent Office. As will be understood, the production of such ferrotitanium alloy by the processes referred to involves, when practiced on an industrially economical scale, the use of the aforesaid natural compounds containing titanic oxid, such as titaniferous iron ore or titaniferous slag, the latter resulting, for instance, from the smelting of such ores by a process of reduction described in United States Letters Patent granted to me, No. 486,941, dated November 29, 1892—that is to say, involves necessarily the use of such titaniferous ores or slag instead of rutile or comparatively pure titanic acid, owing to the prohibitory cost of the latter. The ordinary titaniferous iron ores, such as are most readily and economically available, contain such comparatively low percentages of titanic oxid, and the same may be said of such slag, as to render it difficult, if not impossible, to produce economically with such ingredients by the use of my said processes the ferrotitanium alloy containing such high percentages of titanium as are sometimes desirable.

The problem which I have therefore succeeded in solving by my present invention is that of producing economically and conveniently under existing conditions of supply, of apparatus, and of appliance a new and improved derivative compound, or, perhaps, properly termed "concentrate," possessing in a hitherto unprecedented degree the desirable high percentage of titanic oxid free from ingredients deleterious when viewed in relation to the process in which it is to be employed and possessing properties which cause it to lend itself with particular availability and advantage to participation in the production of ferrotitanium by my aforesaid previously-patented process.

Hitherto available and well-understood methods of concentration are not satisfactorily applicable to the production of this concentrate of titanic oxid. The well-known wet process of concentration is not in this instance satisfactorily effective, because the titanic oxid possesses nearly the same specific gravity as the oxid of iron with which it is, as aforesaid, associated in the ore. On the other hand, the equally well-known magnetic method of concentration is equally inapplicable, because the oxid of titanium possesses much the same magnetic properties as the oxid of iron. It being of the essence of the problem in this instance to separate the titanic acid not only from the other constituents constituting the gangue, but particularly from the oxid of iron for the specific purpose of enriching in titanium its alloy with iron, it will be observed from what has been said that present methods of concentration are comparatively ineffective to attain the end most desired when the ores most usually containing titanic acid are under treatment and consideration. On the other hand, should it be attempted to use in the practice of my said processes for producing ferrotitanium titaniferous slag resulting from the smelting in a blast-furnace of titaniferous iron ores adapted to such smelting—that is, ore containing a good percentage of iron, such as fifty per cent. and fifteen to twenty per cent. titanic oxid—such smelting being accomplished by the process covered by my aforesaid Letters Patent No. 486,941 or by any other, it will be found that such slags, notwithstanding they contain some thirty-five per cent. of titanic oxid, contain also, nevertheless, and intimately incorporated therewith silica to the extent of ten to twenty per cent., this silica being derived from the ashes of the fuel, from the limestone, and from the ore itself in cases where my said patented process is followed and in others much more silica, even as high as thirty per cent., or thereabout, where a special addition of silicious fluxes has been practiced.

It is among the more specific objects of my present improvement and which may be termed an "igneous" method of concentration to remove from the titanic oxid the silica present in more or less important quantities in the ores and simultaneously concentrate the titanic oxid into a secondary product, which latter will constitute the desired ingredient to be employed, as aforesaid, in my manufacture of high alloys of titanium, the said product containing no or so little silica as will not prove injurious and also no or at the most very moderate quantities of iron, though the latter constituent, it will be observed, would prove in no respect detrimental, except in the particular of reducing somewhat in my alloy the desired high percentage of titanic acid. I attain these and the other objects of my invention, broadly and generally speaking, by subjecting to a high temperature derived from an independent external source a supported mixture of titaniferous iron ore, more or less silicious, and carbon in such quantity as is requisite to reduce the oxids of iron and silica, but not the titanic oxid, and a quantity of an earthy base or bases—such, preferably, for instance, as lime, sufficient to form, with the titanic acid under the conditions of heat referred to, a titanate of such bases or of lime.

The degree of heat to which the supported mixture should be subjected is best defined by saying that it should be in each case sufficiently high and sufficiently maintained to reduce the oxid of iron and the silica and other oxids in each charge and not so high as to cause the carbon to reduce the titanic oxid. Differences in the character and bulk of the respective elements constituting the mixture will involve corresponding differences in the degree of temperature and the amount of heat required, and even the limitation above pointed out must be determined by preliminary test in each case. I have found that under ordinary conditions a temperature slightly higher than that of the blast-furnace or somewhat below that of the fusion of platinum—say 1,700° centigrade, or thereabout—proves effective for the purposes of my process. My experience has been that the requisite temperature is most conveniently and therefore preferably obtained by the application to the supported mixture of an electric current, taking like care in this instance that the intensity of the current shall not be so great as to cause the carbon to reduce the titanic oxid in the mixture. Generally speaking, a current of, say, about six hundred amperes and forty volts, more or less, would be suitable, though here again it will be understood that the intensity and volume of the current required will depend upon the bulk of the mixture, its position relative to the current, the proportion of its various constituents, and the like. The current may be applied to the mixture in any convenient manner—as, for instance, while supported in a crucible in an electric furnace substantially as shown in my Letters Patent No. 609,466; but it will of course be understood that any other apparatus in which an equivalent heat could be secured—as, for instance, a Martin-Siemens open-hearth furnace—might be used without departing from my invention.

From the treatment described the following results will be attained: The silica will be reduced to silicon, which will pass into the resulting pig metal with any phosphorus, manganese, &c., in the ore, while the titanic oxid will, combining with the earthy bases or lime, as aforesaid, float off of the molten mixture as slag consisting of titanate, and which can thus be readily run off or otherwise separated from the metallic product. In other words, there will thus have been secured what may be termed a "by-product," in which all the iron and silicon, together with the other impurities of the ore, will be present to all practical purposes and also a concentrated product—to wit, the highly-titaniferous slag containing none or a small amount of either silicic or iron oxid. It will be observed that the titanic slag thus obtained differs from that produced by the use of my former process in many notable and useful particulars. The processes described or claimed in that patent have resulted in practice in the formation of a slag consisting of a silico-titanate of several bases containing in the ordinary conditions of working a blast-furnace a large amount of silica not purposely, but incidentally and unavoidably, introduced by the materials of the charges. Practice demonstrates that this amount of silica, even in the most favorable conditions—i. e., those in which the ores treated are themselves exceptionally free from silica and combined with the best quality of coal and limestone—cannot, except in the most exceptional cases, prove less than ten per cent. to eleven per cent. of the slag. In the great majority of cases, however, this silica runs high in the slag, reaching sometimes as much as twenty per cent. thereof. Such a slag may be fitly termed a "compound in which the acid element is complex," since it consists both of titanic acid and silica, while in the majority of non-titaniferous iron ores this acid is simple, consisting exclusively of silica. In controvention of this, on the other hand, the purpose and result of my present process now sought to be patented is the elimination from the product resulting from its application of all acid elements other than the titanic acid—that is, my present titanic slag is designed to be and is, in fact, as far as can be secured on an industrial scale, a titanate of the bases in which the said element is confined exclusively to titanic acid. Again, by the use of my said previously-patented process a slag is usually and necessarily obtained, containing other impurities, such as sulfur and phosphorus, all of which impair its utility for use in the production of my ferrotitanium, while by the use of my present process the slag or concentrate product is not only exceptionally rich in titanic oxid, but is substantially free from all impurities or from elements or compounds, excepting the earthy bases. Again, by the use of my former process there is obtained merely an ordinary pig-iron, on the one hand, though possessing, of course, the advantages due to its derivation from titaniferous ores, while by my present process the iron product may be a ferrosilicon, possessing, as is well understood, greater value for certain purposes. It will also be observed that the application of my present process does not involve the use of coke or other form of carbon for the purpose of producing heat, and that thereby a prolific source of impurities in the slag, such as alumina and silica from the ashes of the coke, is omitted. The amount of carbon required by my present process is only such as will be sufficient to effect the reduction of the oxid of iron and silica in the ores, and it is therefore possible, without undue or prohibitory expense, to use in my present process high grades of carbon, such as powdered charcoal, whereby the opportunity for impurities in the slag is additionally obviated.

It will of course be understood by those skilled in the metallurgical arts that no hard and fast rules and formulæ can be prescribed for the respective proportions of the various ingredients entering into my mixture, as these proportions must necessarily depend upon local conditions and varying individual characteristics of the respective ingredients.

As affording some examples from which may be deduced by the application of the ordinary skill of the art information sufficient to enable my process to be applied to any other given case I will call attention to the following:

I will first refer to an application of my process to a specimen of ores practically free from silica. A good average ore from the Adirondack region of the State of New York contains in one hundred pounds: iron, fifty-six per cent.; $TiO_2$, eighteen per cent; $SiO_2$, 1.5 per cent., more or less. Such an ore being properly comminuted or preferably powdered was intimately mixed with carbon in a form as free from impurities as possible, such as purified charcoal powder, the said carbon being added in such quantities as to be sufficient to reduce the oxids of iron and silica of the ore, but not the titanic oxid. To this mixture was added powdered lime in quantities sufficient to enable it to form with the titanic acid a titanate of lime, the mixture being subjected to the action of heat in an electric furnace, the current being maintained sufficiently low—say about six hundred amperes and forty volts or less, so as to avoid reduction of the titanic oxid—it appeared that the oxids of iron were readily reduced, yielding a pig metal containing more or less carbon and the usual constituents—silicon, manganese, and whatever phosphorus and sulfur were contained in the ore, while the titanic acid floated off on the top of the mixture in the form of a slag and in combination with the lime, a titanate of lime, which was readily separated and removed from the pig metal before casting the latter.

In this instance of the application of my invention the mixture referred to consisted of ore one hundred pounds; carbon, twenty pounds; lime, 12.6 pounds. From this mixture was obtained (less unavoidable losses attending any metallurgical operation) some fifty-eight pounds of pig metal containing, as usual, silicon, carbon, phosphorus, manganese, &c., and some thirty pounds of a titanate of lime containing

| Pounds. | | Per cent. | |
|---|---|---|---|
| $TiO_2$... | 18.00 | $TiO_2$... 58.80 | 35.28 per cent. |
| Lime.. | 12.60 | CaO... 41.20 | titanium. |
| 30.60 | | 100.00 | |

In another instance of the application of my said process to the same ore in which the mixture was not subjected to the heat sufficiently long to reduce completely the oxid of iron there was obtained a slag which analyzed as follows:

| | Per cent. | |
|---|---|---|
| $TiO_2$ | 50.00 | 30 titanium |
| CaO. | 20.00 | |
| FeO | 28.50 | 22 iron. |
| SiO | .70 | |
| MgO | .30 | |
| | 99.50 | |

Secondly, reference will now be made to an example of the use of my process upon titaniferous iron ores containing silica to a large extent. In such cases it is useful to bear in mind the well-known fact that when different oxygenated compounds are subjected simultaneously under proper conditions of reduction to the action of an electric current those of which the heat of formation is the least will be decomposed first. Thus, for instance, oxid of iron will be decomposed by carbon before silica, and silica before titanic acid. Therefore under the ordinary conditions of heat prevailing in the usual practice of a blast-furnace employed in the reduction of titaniferous ores very little titanic acid, if any, is reduced, while the silica, on the contrary, is reduced frequently to the extent of as high as twelve to fifteen per cent. silicon—that is, in the manufacture of so-called "ferrosilicon"—and even in the manufacture of ordinary pig-iron as much as three and four and even five per cent. of silicon are found in the pig. Notwithstanding this, however, by far the largest proportion of the silica passes away into the slag as silicate, where, in the case of highly titaniferous ores it becomes associated with the titanic acid in the form of a titano-silicate. On applying my process to a titaniferous ore high in silica the following results were obtained. The ore referred to contained the following constituents per one hundred pounds: $SiO_2$, twenty; $TiO_2$, 14.50; 64 $Fe_2O_3$ = Fe, 44.80; gangue, 1.50, more or less. To one hundred parts of this ore properly pulverized were added 10.15 of lime and the proportion of carbon requisite to reduce both the silica and the oxids of iron, but not the titanic acid. This mixture having been subjected to a somewhat more intense heat than that in the previous case described, but not so high as that requisite to reduce titanic acid, there were obtained as resultant products a ferrosilicon containing 15.20 per cent. silicon—that is, practically as much as could be expected from the given ore—and a concentrate of titanic acid as titanate of lime in substantially the same proportion as in the previous instance, where the proportion of lime was practically the same—that is to say: $TiO_2$, 58.80 per cent.; CaO, 41.20 per cent.

By careful attention and skilful manipulation of the temperature employed it will be possible to utilize a degree of heat just short of that which would cause the reduction of the titanic acid. In such case in time substantially all of the silica would be inevitably reduced and pass into the pig metal ferrosilicon, the value of which is well understood, and which thus becomes an enhancing by-product of my process of concentration.

Either one of the earthy bases alumina or magnesia might be substituted for the lime without departing from my invention; but the latter is that particular earthy base which is, so far as is now known to me, the most valuable and most capable of being economically secured in the highest condition of relative purity. This addition of lime or its equivalent is thus required in my present process because no dependence can be placed upon the small quantities of the other earthy bases incidentally or accidentally present in the ores treated to form, with their titanic acid, that type of titanate having the proper fusibility at the particular temperatures at which silica and the oxids of iron will be reduced by the carbon, while the titanic acid remains unaffected. Any earthy base present in the ores will, however, of course diminish proportionately the amount of the lime to be added and will to that extent prove of advantage. In brief, my concentrate as obtained directly from titaniferous ores by the preferable process hereinbefore described is essentially a titanate in which the lime is in such excess as to justify designating the compound as a "titanate of lime." It is necessarily apparent from the foregoing that for lime might be substituted without departing from my invention a calcite or carbonate of lime, (if sufficiently free from impurities,) since this would in the process become an equivalent for lime as soon as the carbonic acid thereof had been expelled by heat. So, too, for calcite might be substituted a dolomitic limestone if sufficiently free from impurities. In this case the lime and magnesia, one or both, left after the expulsion of the carbonic acid by heat would combine with the titanic acid to form the concentrated titanate; but even in this case the resulting compound would prove predominantly a titanate of lime.

It will be observed that in the application of my process the mixture subjected to heat is supported during the operation or until the requisite reactions have been accomplished, in which particular my present process differs materially and with novel results from the operation of the ordinary blast-furnace upon a similar mixture. It will also be observed that in the operation of my present process the temperature required is not developed in the midst of the mixture by the insertion and combustion therein of fuel of any kind, but, on the contrary, the requisite heat is derived from a combustion or other source situated outside of the mixture supported as aforesaid, which heat is conveyed to or into the mixture electrically or in any other convenient manner.

What I claim as new, and desire to secure by Letters Patent, is—

1. The process of producing out of titaniferous iron ores, a concentrate containing a higher percentage of titanic acid and practically free from silica and other impurities of the ore, such as sulfur and phosphorus, which consists in mixing with such ores sufficient carbon to reduce the oxids of iron and silicon therein contained, and sufficient earthy bases to form with such titanic acid a basic titanate of such earthy bases and subjecting said mixture, while supported, to a high temperature derived from an extraneous source of heat and sufficient to reduce the iron oxid and the silica, but not the titanic acid, and to cause the resulting silicon and other impurities of the ore to remain on the one hand with the iron, while on the other hand the titanic acid combines with the said earthy bases, substantially as and for the purposes described.

2. The process of producing out of titaniferous iron ores, a concentrate containing a higher percentage of titanic acid and practically free from silica and other impurities of the ore, such as sulfur and phosphorus, which consists in mixing with such ores sufficient carbon to reduce the oxids of iron and silicon therein contained, and sufficient lime to form with such titanic acid a basic titanate of such lime and subjecting said mixture while supported to a high temperature derived from an extraneous source of heat and sufficient to reduce the iron oxid and the silica, but not the titanic acid, and to cause the resulting silicon and other impurities of the ore to remain on the one hand with the iron, while on the other hand the titanic acid combines with the said lime, substantially as and for the purposes described.

AUGUSTE J. ROSSI.

Witnesses:
WALTER D. EDMONDS,
PHILIP C. PECK.